United States Patent
Sluiman

(10) Patent No.: US 6,658,425 B1
(45) Date of Patent: Dec. 2, 2003

(54) GENERIC DATA CENTRIC OBJECT STRUCTURE AND IMPLEMENTATION

(75) Inventor: Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/173,400

(22) Filed: Oct. 15, 1998

(30) Foreign Application Priority Data

Mar. 16, 1998 (CA) .............................................. 2232246

(51) Int. Cl.⁷ ................................................ G06F 7/00
(52) U.S. Cl. ................. 707/103 R; 707/102; 707/104.1
(58) Field of Search ........................... 707/3, 4, 5, 103, 707/100, 104; 709/318; 717/1, 10

(56) References Cited

U.S. PATENT DOCUMENTS

| | | | | |
|---|---|---|---|---|
| 5,542,078 A | * | 7/1996 | Martel et al. ................ | 707/101 |
| 5,613,120 A | * | 3/1997 | Palay et al. .................... | 717/10 |
| 5,680,619 A | * | 10/1997 | Gudmundson et al. ......... | 717/1 |
| 5,724,589 A | * | 3/1998 | Wold ........................... | 709/318 |
| 5,764,973 A | * | 6/1998 | Lunceford et al. ............. | 707/1 |
| 5,809,507 A | * | 9/1998 | Cavanaugh, III ............ | 707/103 |
| 5,822,580 A | * | 10/1998 | Leung .................... | 707/103 R |
| 5,857,197 A | * | 1/1999 | Mullins ....................... | 707/103 |
| 5,956,730 A | * | 9/1999 | Burroughs et al. ......... | 707/104 |
| 5,991,762 A | * | 11/1999 | Nagarajayya et al. ....... | 707/100 |
| 6,006,224 A | * | 12/1999 | McComb et al. .............. | 707/5 |
| 6,018,627 A | * | 1/2000 | Iyengar et al. .............. | 717/103 |
| 6,018,743 A | * | 1/2000 | Xu .......................... | 707/103 R |
| 6,100,885 A | * | 8/2000 | Donnelly et al. ........... | 345/333 |
| 6,122,627 A | * | 9/2000 | Carey et al. .................... | 707/4 |
| 6,167,564 A | * | 12/2000 | Fontana et al. ............. | 717/104 |
| 6,427,230 B1 | * | 7/2002 | Goiffon et al. ............. | 717/108 |

OTHER PUBLICATIONS

Object Wrapper: an Object–Oriented Interface for Relational Databases 1089–6503/97 (IEEE).*
"Persistent Heaps"—Massimo Anocona—CH2799–5/90/0000/0324—1990 IEEE, pp. 324–331.*
"Run–Time Support and Storage Management for Memory–Mapped persistent Objects"—Bruce R. Millard, Partha Dasgupta, Sanjay Rao and Ravindra Kuramkote—0–8186–3770–6/93—1993—IEEE, pp. 508–515.*

* cited by examiner

Primary Examiner—Shahid Al Alam
Assistant Examiner—Anh Ly
(74) Attorney, Agent, or Firm—David A. Mims, Jr.

(57) ABSTRACT

In an object oriented programming environment, an active data object accesses its stored data (such as its property and state data) by inlining the access code at the point at which access to the data on that property or state is required. Multiple access requests to the same data result in inlining the same access code in the data object multiple times. A system is thus provided to isolate the access code from active data objects in a program, to persistent wrapper objects that are reusable by one data object or many. It is the wrapper object that inlines all of the access code in a single location. Each data object user of the access code merely inlines a method invocation on the appropriate wrapper object. This reduces the size of data objects where there is now only a proliferation of single method invocations for most access request. It also simplifies the procedure for changing stored data, where only the references in individual access code blocks in wrapper objects need be changed, rather than at multiple access points throughout a data object.

11 Claims, 13 Drawing Sheets

GENERIC DATA CENTRIC OBJECT STRUCTURE AND IMPLEMENTATION

FIELD OF THE INVENTION

The present invention is in the general field of data processing, and provides a technique for accessing relational and other structured data from an object based application model.

BACKGROUND OF THE INVENTION

An object based application model is an application model in an object oriented (OO) programming environment. Data stored statically, such as in a relational data base, can be presented in an object based application model and manipulated at run time, encapsulated in a self-contained entity called an object. In addition to data, the object contains its own instructions to perform operations on the data.

OO programming in general is based on the notion of inheritance; the attributes and methods invocable in an object are defined through a class hierarchy that permits functionality to be reused from one object to another when active objects are instantiated. The active objects are constructed in dynamic memory according to a set of constructors defined through class inheritance.

The manner in which access to the stored data is made through an active object must be specifically programmed, particularly if the data is stored in a structured format such as a relational database. As discussed in European Patent Application 0 690 375 A2 of International Business Machines Corporation for "Persistent Object-Mapping In An Object-Oriented Environment", published on Jan. 3, 1996, an object called a schema mapper can be employed to generate all of the database access code in the object. A sample of code to map an object with a single database table is provided in the published application. In order to map the object with data in multiple discrete tables, databases and/or memories, similar code would have to be generated in the object for each data access location.

SUMMARY OF THE INVENTION

The present invention is directed to structuring an object that can be used for simple and complex mappings to data, as well as various forms of data resource management. The object structure of the invention can be used for wrapping legacy code, as well as newly written object-based code.

The invention is also directed to structuring an object so that both vertical and horizontal slicing techniques on the inheritance hierarchies can be used.

Accordingly, the present invention provides a system for giving program data objects access to stored data, implemented in an object oriented programming environment. The system provides at least one object wrapper isolating access code for the stored data into reusable modules, and means for invoking said access code from the program data objects. Preferably, the object wrappers consist of a plurality of access code modules, each of which contains access code for a unique view of data accessed from multiple storage locations.

The present invention also provides an object builder tool implemented in software for mapping program data objects with stored data. The object tool includes means for wrapping blocks of access code to the stored data in reusable code modules, and means for inlining access code to the reusable code modules in the program data objects. Preferably, the means for wrapping blocks of access code to the stored data in reusable code modules consists of means for isolating attributes from methods in a given program data object, means for defining each of a set of attributes and methods for the given program data object in one or more one wrapper objects and sequentially mapping each attribute and method in the given data object to, respectively, at least one attribute and method in the one or more wrapper objects, and then means for generating the reusable code modules in the wrapper object(s) according to the defined attributes and methods. Also, preferably, the means for wrapping blocks of access code to the stored data in reusable code modules consists of means for wrapping blocks of access code to unique views of the stored data, with at least some views representing data accessed from multiple storage locations.

Additionally, the invention provides a method for creating wrappers for reusable code blocks for access to stored data. For each selected data object, the method consists of defining at least one persistent object instance, defining the attribute mapping from the data object to said at least one persistent object instance, defining the method mapping from the data object to said at least one persistent object instance, generating code to define said at least one persistent object according to the defined associations of data object attributes and methods, and generating inline code in the data object to invoke methods in said at least one persistent object to access the stored data.

The invention is also directed to a program storage device readable by a machine, that tangibly embodies a program of instructions executable by the machine for performing the above recited method steps.

BRIEF DESCRIPTION OF THE DRAWINGS

Embodiments of the invention will be described in detail below in conjunction with the accompanying drawings in which.

DETAILED DESCRIPTION OF THE PREFERRED EMBODIMENTS

Figure 1:
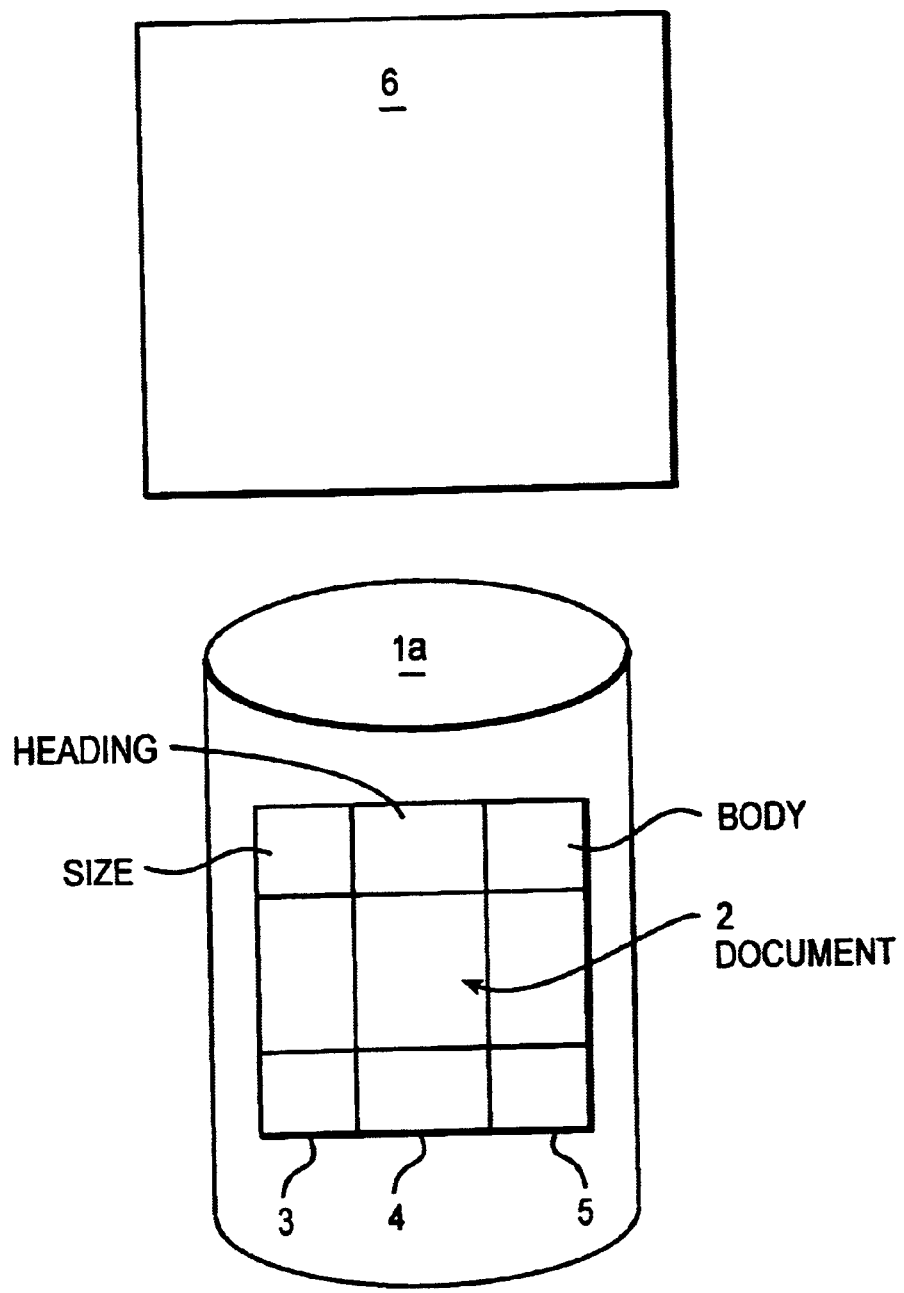
FIG. 1 schematically illustrates the relationship between an active object and a single data location, according to the prior art.
Figure 2:
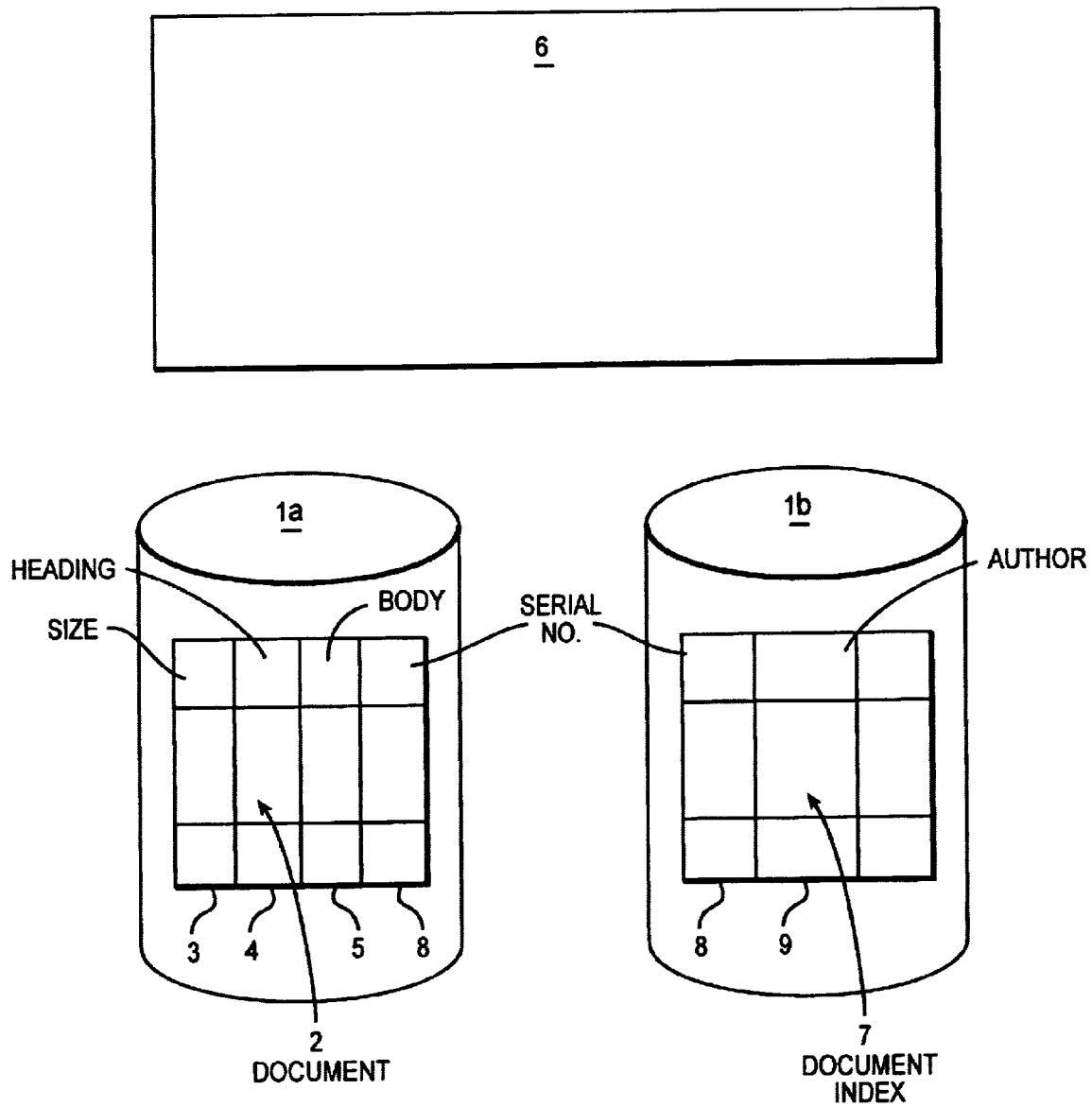
FIG. 2 schematically illustrates the relationship between an active object and multiple data locations, according to the prior art.

FIGS. 1 and 2 schematically illustrate the access relationship between an active data object (DO) and stored data, according to the prior art. To discuss this access relationship, the example of a document having a set of properties or state data is used. The properties or state data of the document object are the aspects of the object or its components that the user may want to access and manipulate.

Taking the simple case first in reference to FIG. 1, documents are defined as having three properties, size, heading and body. The data on "documents" is stored in a traditional relational database 1a, in a document table 2, organized in columns 3, 4, 5, for data on each of the three document properties.

Each instance of a document in the document table 2 can be represented by an active data object represented generally by reference numeral 6, instantiated when a user reads, writes or gets the document. The document object 6 includes access code for each of the three properties to target the relevant column in the document table 2. In traditional programming, this access code is placed in the document data object 6a at the point at which access to the data on that property is required. An example of data access code is that generated by the schema mapper described in the above-referenced European Patent Application No. 0 690 375 A2. Repeated access requests result in a data object with large inter-related blocks of code.

The preferred embodiment of the present invention has been implemented in IBM's Component Broker series (CBSeries), a data model defined by the C++language mapping of the Object Management Group's Common Object Request Broker Architecture (OMG CORBA) Version 2.0.

One aspect of CBSeries/CORBA is that it does not permit direct reference to object properties. The properties or state of an object are isolated from its behaviour, and also from the transactional and operational aspects of the object by defining the document's Interface Definition Language or IDL and stating its attributes. A set of "get" and "set" method are used to get the document size get the document's heading and get the documents body in order to access these properties, and to set the documents size, set the document heading and set the document body in order to create these properties in a new document. The set methods are also used to modify an existing document.

It is very rare that all data is found in only one table in a single data base. FIG. 2 illustrates a situation that is more complex, but more likely to be closer to reality. In addition to the three properties of size, heading and body, the document may have other properties such as serial number and author name, used for indexing. In the illustrated example, this additional data is stored in columns 8, 9, in document index table 7, possibly located in a separate relational data base 1b. Because tables 2 and 7 contain data on properties for the same documents, there must be some relationship between them. Usually the serial number (generally designated as column 8 in the tables) is a common element. In relational data base terminology, this common element is referred to as the "foreign key".

Reference to multiple tables is common in relational data base technology. To handle this, relational space includes mechanisms called "views" for linking the tables to permit users to extract subsets of information from across them.

In current implementations, in order to access ("get" a view of a document from its data object, serial access code segments, for each table referenced, is written in the data object. The identity of the document is likely to be its foreign key (its serial number in the example illustrated in FIG. 2), and the data for this is found in multiple databases. So, in addition to providing the access code for all tables referenced in the document view, the data object must include functionality to relate the document identity to all of the code segments for accessing the database tables. Each access code segment causes the data from that table to be stored locally, so that the desired information is available to the object. This may result in the local storage of multiple copies of the data.

If the name or data storage location of a property changes, there are complex problems associated with mapping the change into the code written in the data object. In particular, all of the access code must be checked to reset the value of all references to the modified property, to avoid data access errors. Similarly, when the user is creating or adding to a document, the order of table access is determined by the data base implementation. This order must be strictly followed, particularly where changes are made to a foreign key, to maintain consistency across the tables. (In the case of setting a foreign key, checkpoints must be maintained in the data object to ensure that the foreign key has been set in all the tables containing information for the data object.) Where the access code is managed sequentially, as in the prior art, there are more and more issues to take care of in manipulating the stored data, and the code in the data object becomes longer and more complex.

The present invention provides a data object structure for mapping the data object to one or more database tables, or other data locations, in a manner that simplifies these access and access coding requirements. This is illustrated schematically in FIG. 3.

A data object 10 is divided into one or more modules called persistent object wrappers (PO) 11, 12, 13. The role of the PO is purely to isolate the raw data access and management code of the smallest meaningful units of state.

In the simple case, a data object has one PO and delegates all of its "get" and "set" methods, as well as its state associated behaviour to the PO. The data object could also provide type mapping, but in the preferred embodiment, the DO is designed to provide nothing more than attribute name. As discussed in detail below, type mapping is also delegated to another pure helper class that has no state of its own. Then, when the user wants to "get" a property, instead of having the data object execute the "get" method itself and obtain its local copy of the data, the data object simply invokes the "get" method on its PO. Providing a DO with type mapping as well as attribute name, according to the invention, would be an obvious modification to the following description, to the person skilled in the art.

Where, as in the preferred embodiment, the DO provides only the attribute name, then depending on the implementation environment, the getter method inlined in the DO could constitute a simple statement, such as:

```
string docSize( )
{
return DocumentPO.docSize( );
}
```

All of the code for accessing the document data, including the docSize property, is found in the PO, instead of being inlined in the DO. The code generated in a PO for "getting" a particular attribute is reusable by any user of the PO.

Figure 13:
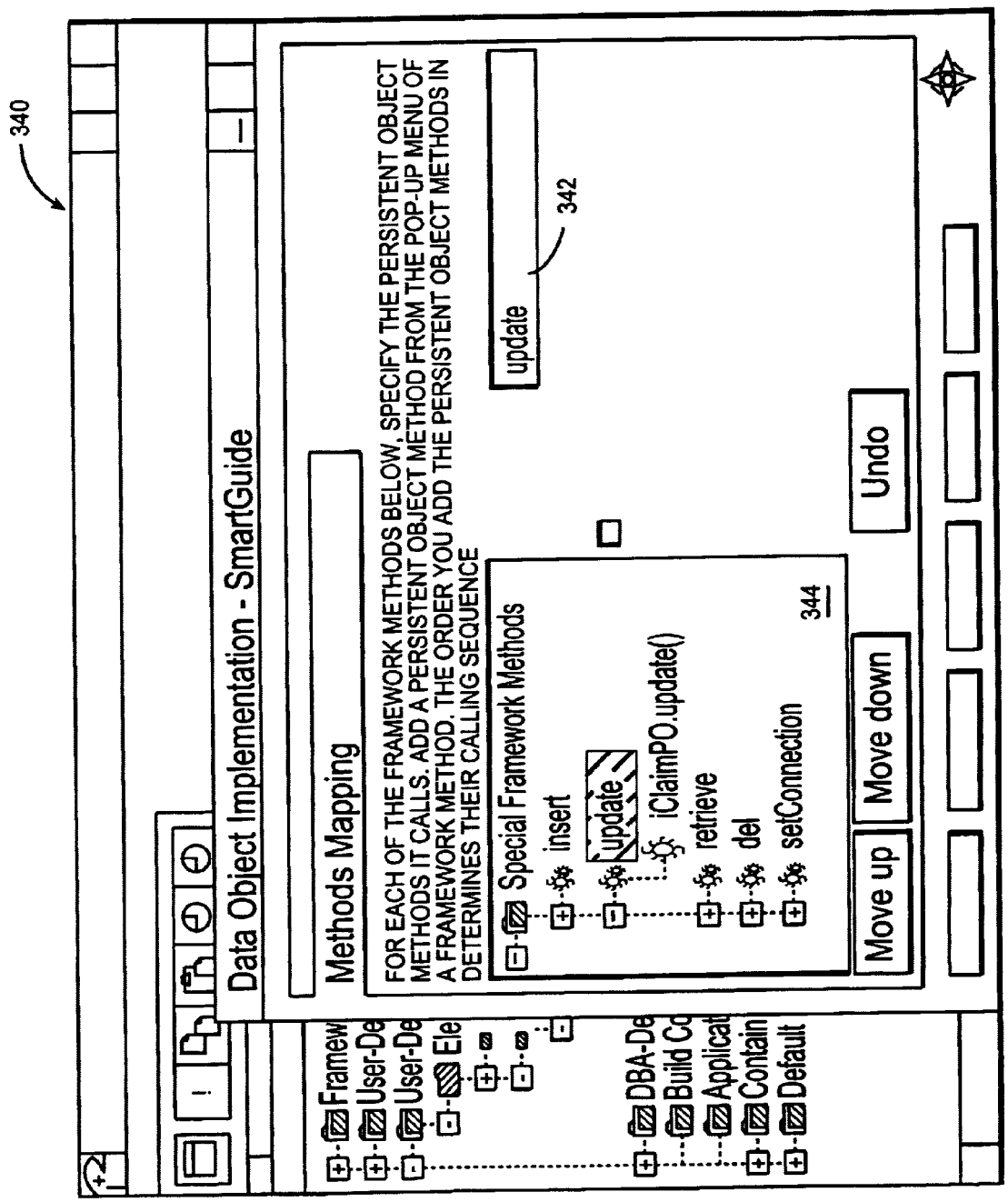

In the same way, entering changes to the stored data is also modularized. A brief method invocation, often a single statement, in the body of the DO invokes the appropriate update methods in one or more persistent objects, in the order required for effectively updating the stored data. This is described in detail below in conjunction with FIG. 13 illustrating an aspect of the preferred embodiment.

This approach enables the user to minimise the amount of code by creating PO interfaces to the data source(s) for frequently accessed views of the data. However, the basic structure of the DO remains unchanged, and direct mapping, with inlined code, or using a mapping helper class outside the builder tool, is still possible, particularly for complex attributes in the DO that require mapping that is unique to the particular DO and isolated from the reusable PO. This could include infrequently accessed document views, or views that include data requiring special approvals or security to access.

Figure 3:
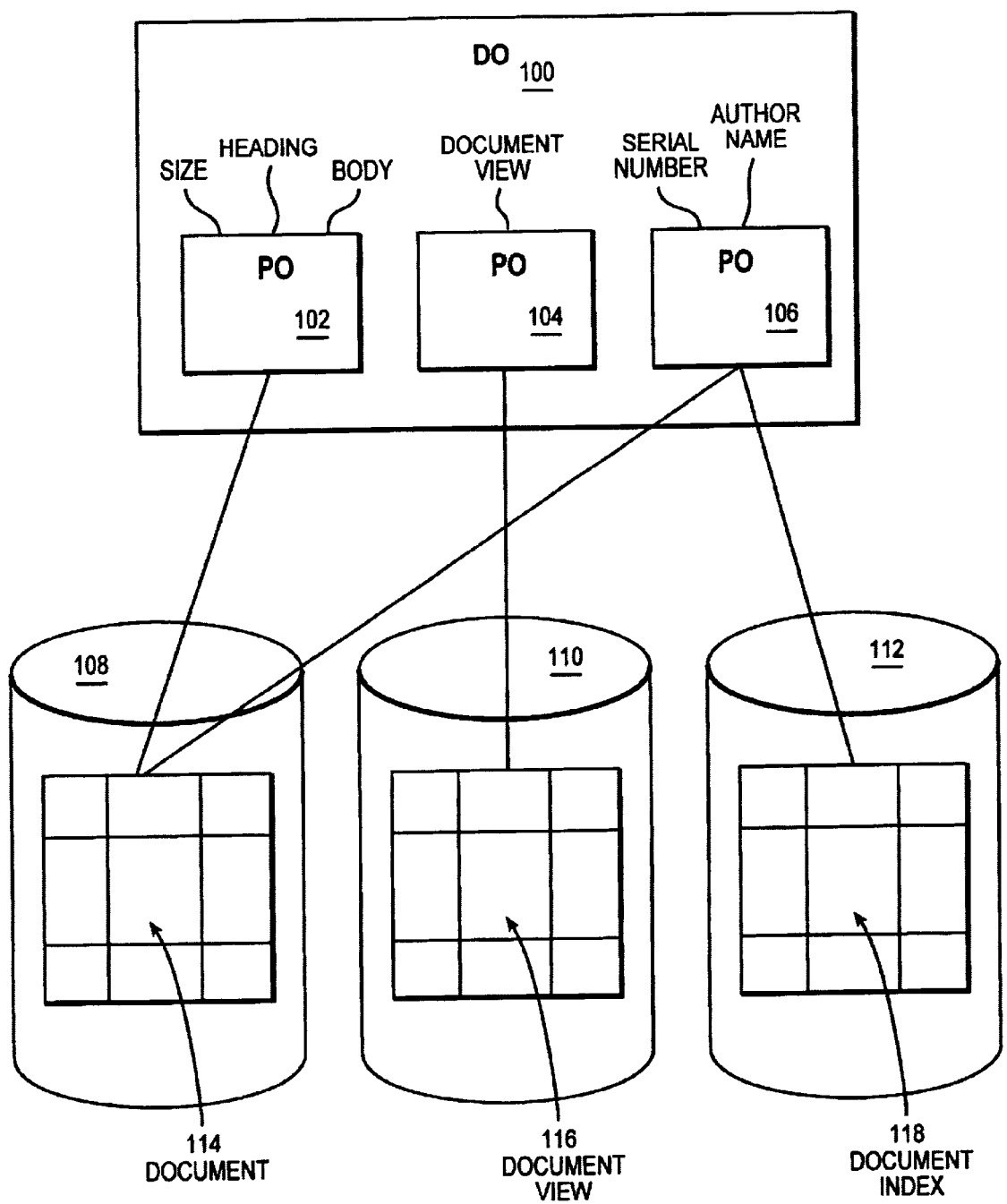
FIG. 3 is a view similar to the views in FIGS. 1 and 2, schematically illustrating the relationship between a data object and multiple data locations, according to the invention.

The example shown in FIG. 3 illustrates a relatively complex situation. For an instance of a document, the data object (DO) 100 has at least three persistent objects (PO), a PO 102 representing the data in a document table 114 in a first data base 108, a PO 104 representing the data in a document view table 116 in a GUI (graphical user interface) data base 110, and a PO 106 representing the data in the document index table 118 in a third data base 112. When the user wants access to author information, the DO 100 will invoke "get author" on PO 106 representing document index table 112, rather than having its own copy of the access code. Similarly, to access the document body, the DO 100 will delegate, and invoke the "get body" method on PO 102 representing document table 114. In both cases, the "get" method invocation represents a single line of code in the body of the DO, rather than a copy of the data from the data base table.

Figure 4:
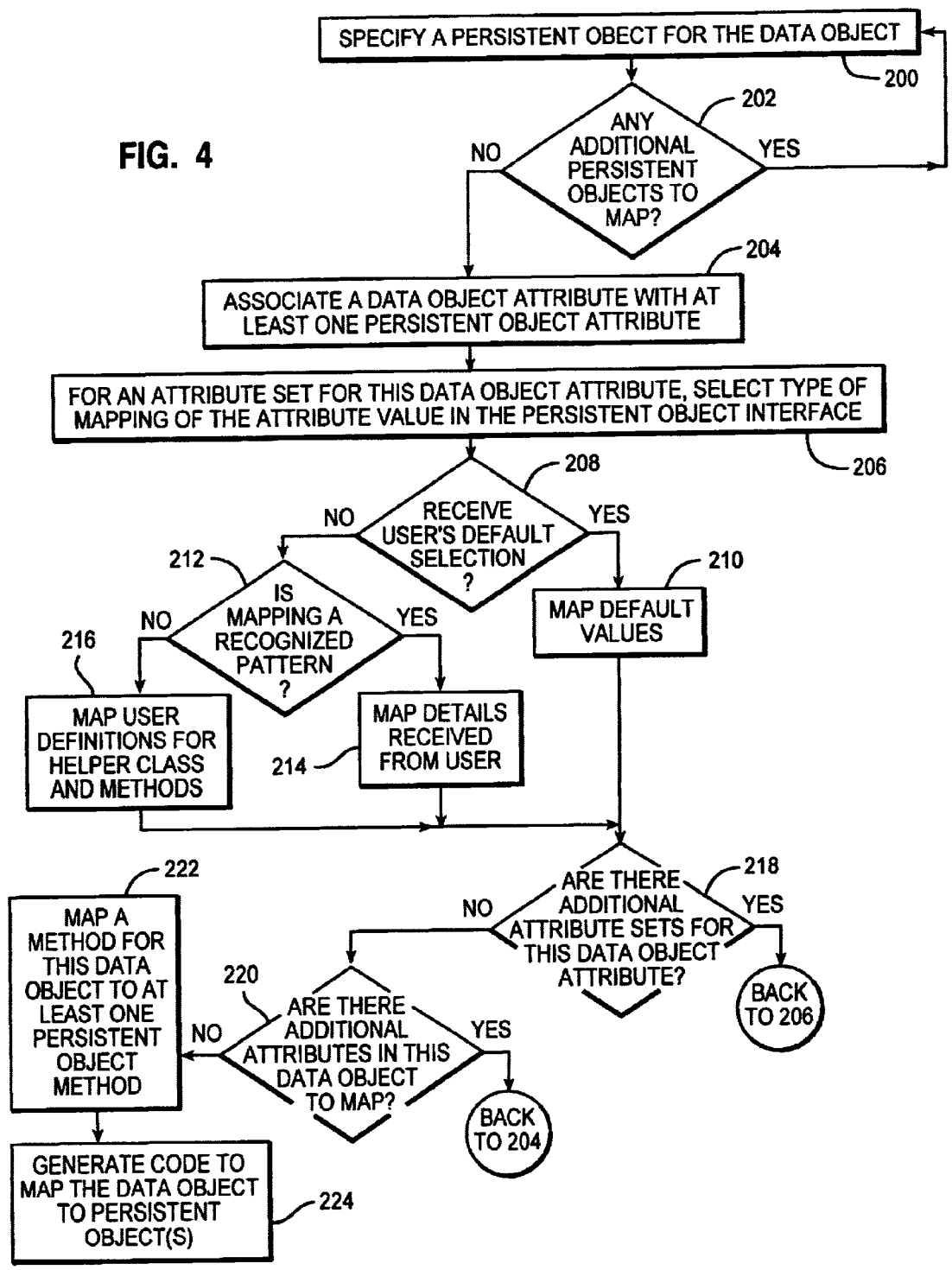
FIG. 4 is a flow diagram showing the steps for creating data access through persistent objects, according to the invention.

The invention has been implemented in an object builder tool that automates the above-described modularization of data base access code in persistent object (PO) wrappers in a data object (DO). The tool operates to generate the code to create one or more PO wrappers containing the attributes and methods of the DO. FIG. 4 is a flow diagram setting forth the steps and decisions taken in the tool to map and then generate this PO wrapper code. FIGS. 5 through 12 are a series of views or windows from a computer display of the user interface in the object builder tool. These views illustrate the manner in which the steps for setting parameters for the get and set methods for the PO's are presented to the user and information is elicited for code generation to achieve the PO wrapping.

Although the parameters for the get and set methods are defined by the programmer, they are a reflection of the rules in the database. In the case of relational databases, these are strict rules. For example, referring back to FIG. 3 where the serial number in the document index table 118 is the foreign key for the document table 114, proper sequencing requires that a new serial number is indexed before it is added (set) in the document table.

Particularly in the case of multiple PO's, the data object has the responsibility of dealing with how the PO's relate to each other. By isolating out the PO's, the data object deals purely with the relationship of the PO's to each other in the context of the data object. This is similar to the modularizations done when data schema are made of various configurations over a set of tables.

In FIG. 4, the user must first select the PO wrapper to be used for the simple access code (block 200). The user can select as many instances of POs as needed (block 202), typically one PO instance for each database table being accessed. Each PO instance must have a unique name relative to the other PO instances, although instances of the same PO type can be multiplied, if needed.

Figure 5:
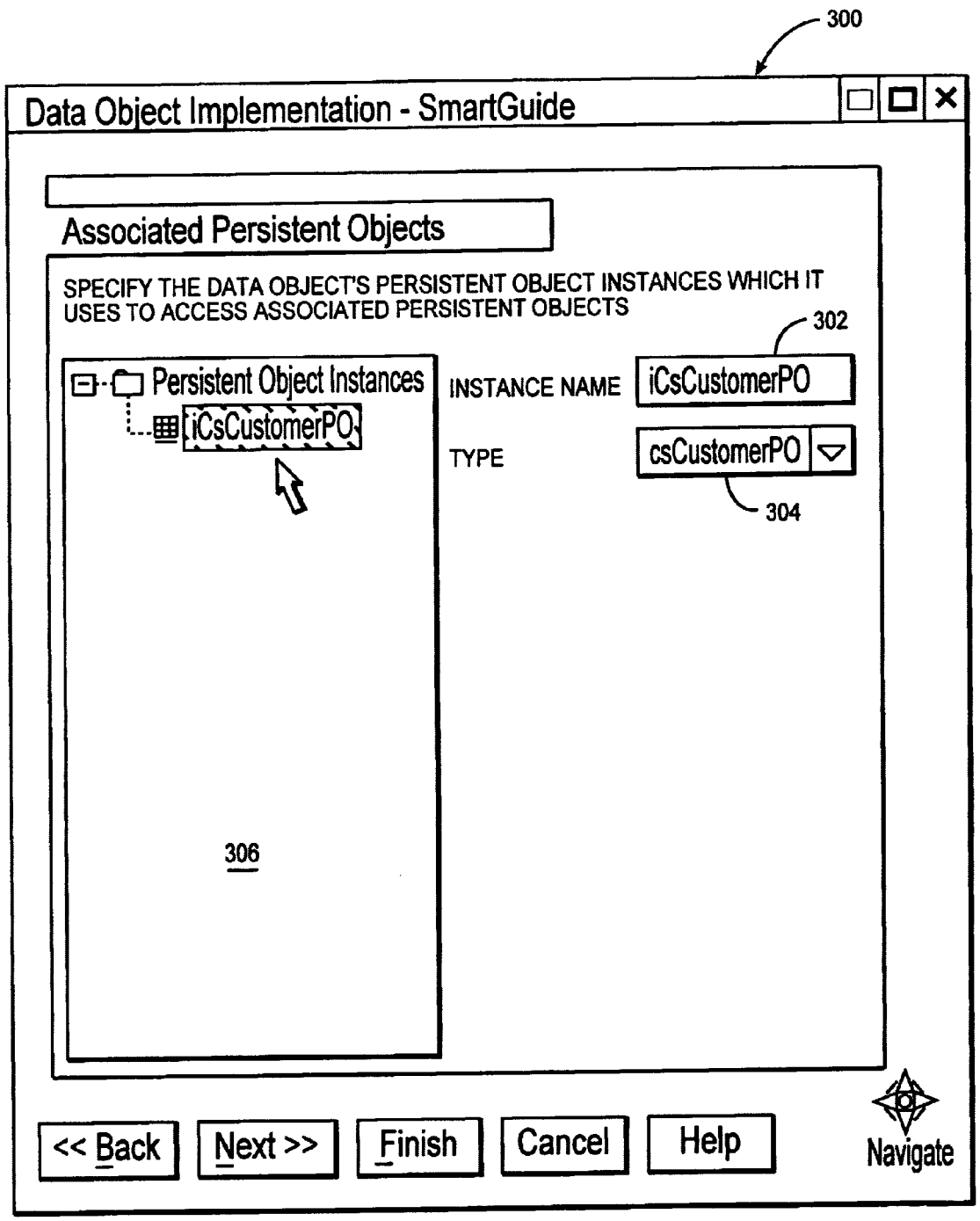
FIGS. 5 through 13 are views from a computer display illustrating, by way of screen captures, the operation of a tool that can be used to automate the creation of data objects of the structure of the invention, according to a preferred embodiment of the invention.

FIG. 5 illustrates a user interface in the builder tool. The illustrated window 300 for defining persistent objects associated with a specific data object, includes an instance name field 302 which is automatically defined when the user makes a selection from the list in the type field 304, and a tree view window 306, called Persistent Object Instances, that presents a current hierarchy as the persistant objects associated with the data object are built by the user. The type field list 304 contains a scrollable list of PO types that the builder tool knows about. The user can also input an override type name into field 304 that is not found in the tool's list. In that case, the builder tool will check that the user override name is unique before generating the PO. A PO is generated when the user imports a data base table definition (as in the example discussed and illustrated herein). This is supported as an import for tables, views (SQL types) or from a JavaBean.

The windows 300, 310, 340 illustrated in FIGS. 5 through 12 include other common windowing features, such as size and close icons, and buttons to move forward and backward, and to end the window or access help, but as these form no part of the invention, they have not been separately referenced.

Returning to FIG. 4, once the persistent object instance(s) for a data object have been specified (blocks 200, 202), each DO attribute must be associated with a PO attribute (block 204). In the builder tool view shown in FIG. 6, the Attributes Mapping window 310 (which is similar in appearance to the Associated Persistent Objects window 300 shown in FIG. 5) includes the field 312 in which a single mapped persistent object attribute is shown, field 314 defining the mapped attribute's type, and tree view 3 16 showing the attribute hierarchy as it is constructed.

Figure 6:
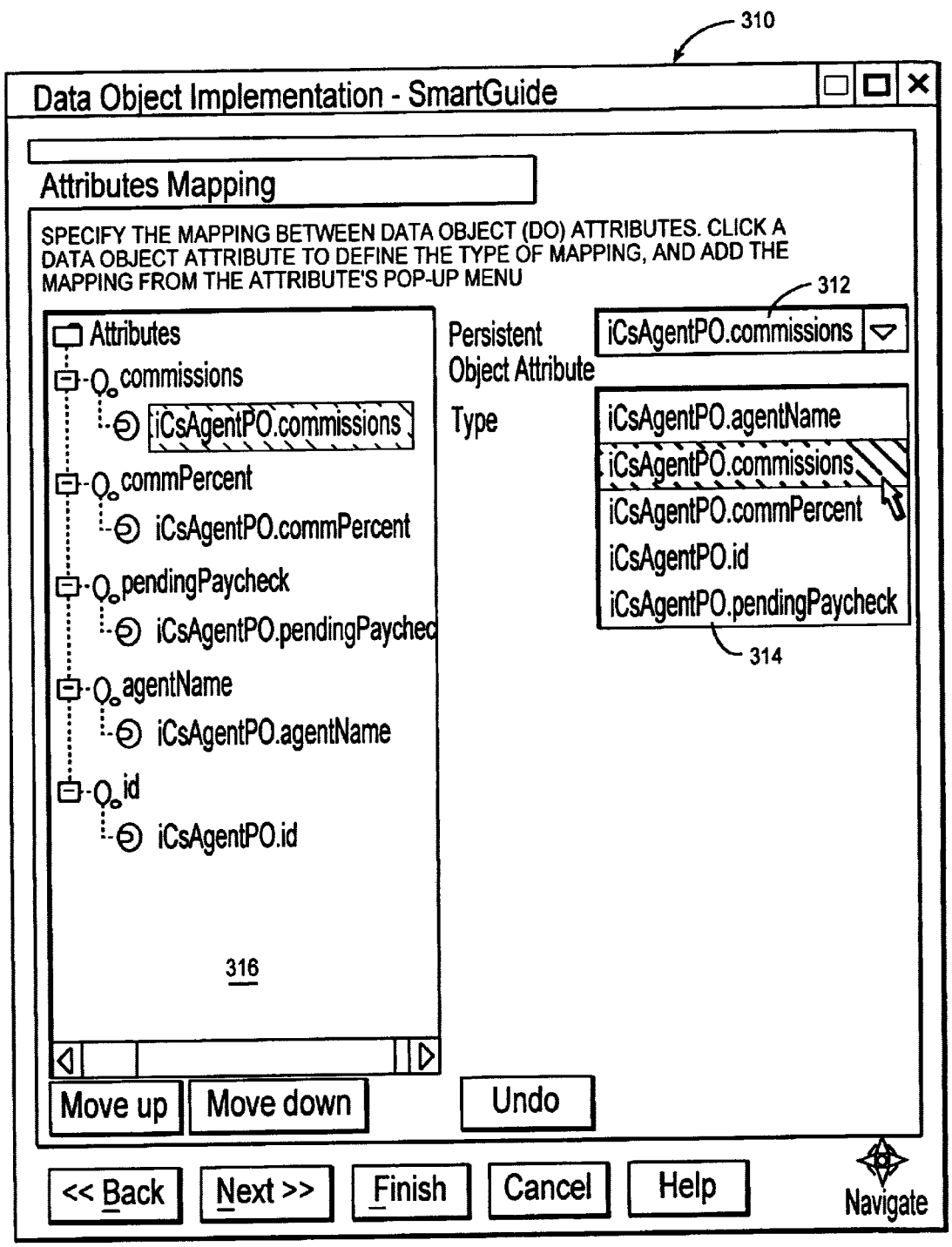
Figure 7:
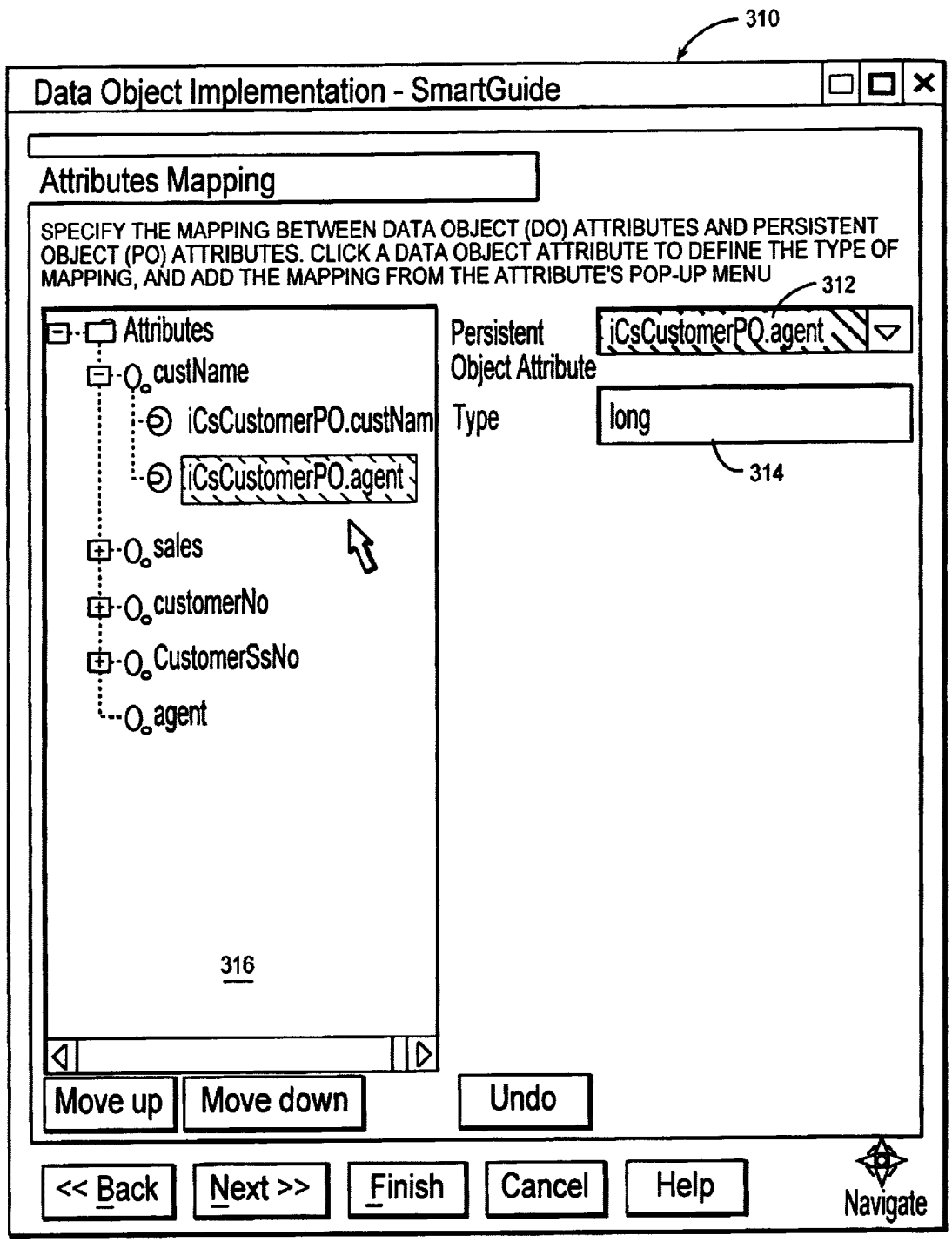

This mapping can be a one-to-one mapping, as shown in FIG. 6, or one DO attribute can be mapped to many PO attributes, as shown in FIG. 7. Consequently, the type (shown in field 3 14) may vary. In FIG. 6, the DO attribute name, drawn from the type field 314, is identical to the PO attribute name 312. In FIG. 7, the attribute type 312 is simply described as "long", and the attribute of "customer name" maps to two "customer" PO attributes shown in the tree view 316, "customer name" and "agent".

For each attribute mapping set, the user selects the type of mapping to be done as the value moves from the DO interface to the PO interface (block 206 in FIG. 4). The tool of the preferred embodiment queries the user input to provide the appropriate mapping. Currently, three options are provided as illustrated in the screen captures of FIGS. 8 through 10. The user can select default values provided by the tool (blocks 208, 210, in FIG. 4), or can input parameters for a pattern recognised by the tool, such as map as a key or as an object reference (blocks 212, 214). If the pattern is not a recognised pattern or default mapping, the user must provide a helper class to provide definitions for the class and its methods (block 216).

Figure 8:
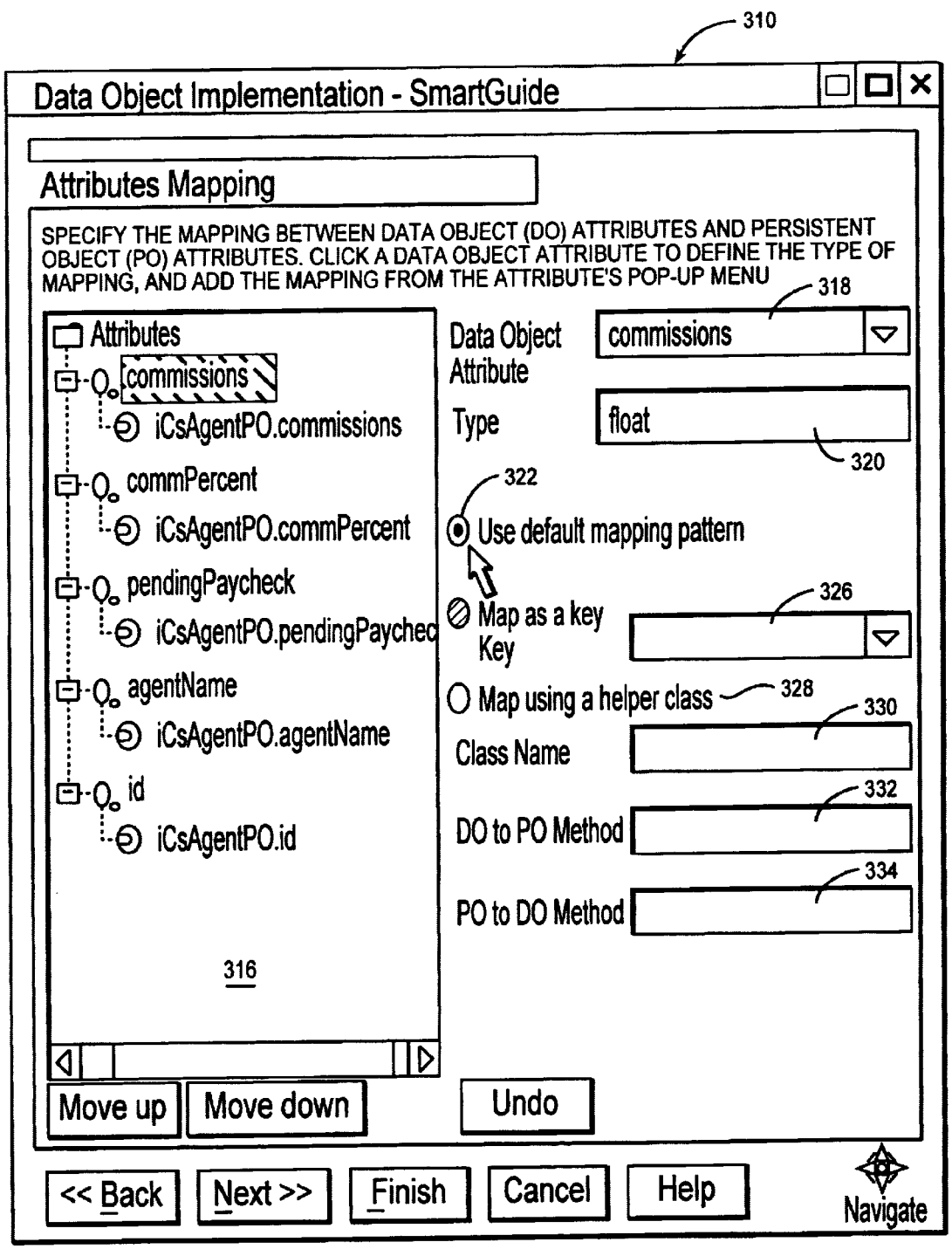
Figure 9:
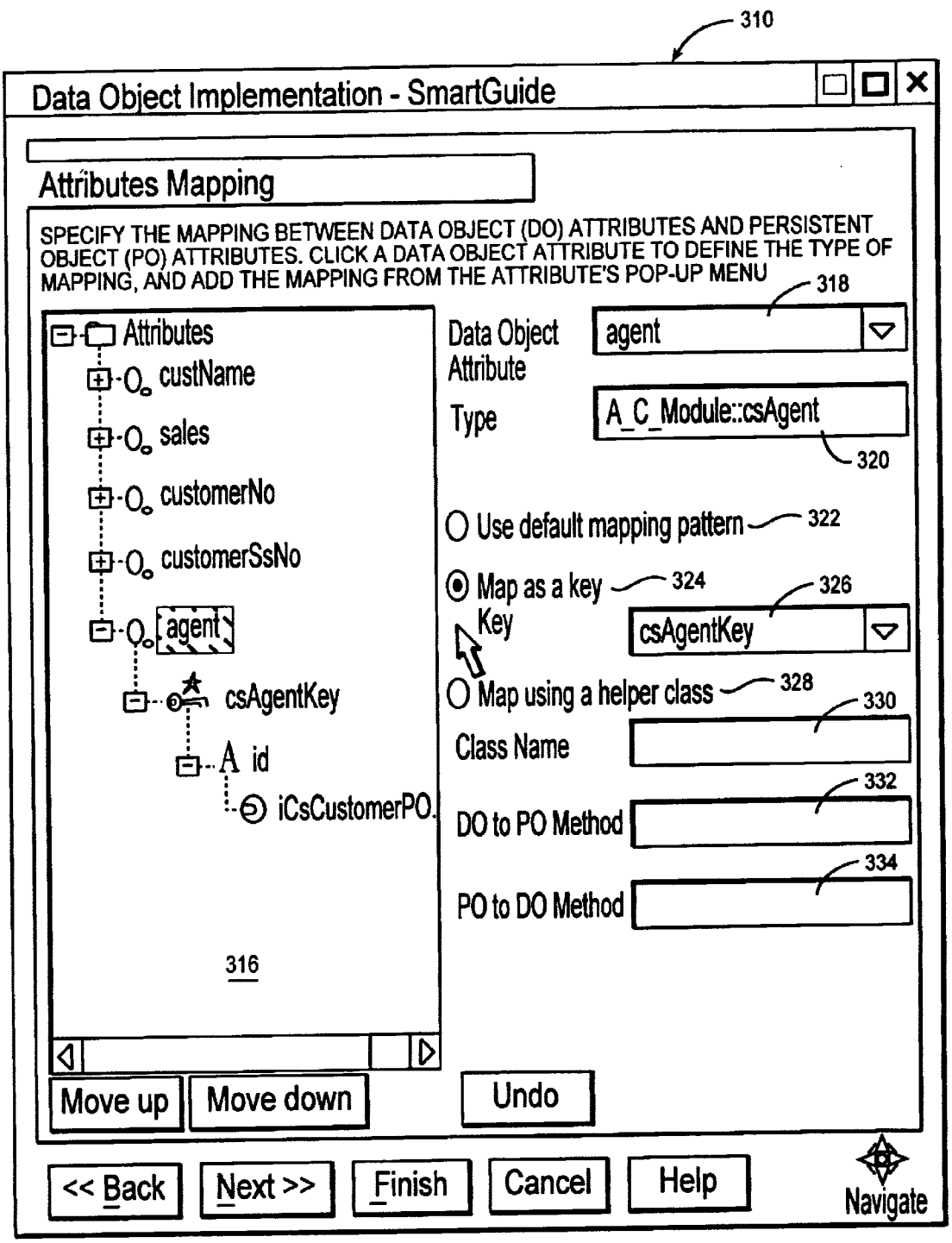

As shown in FIG. 8, the default mapping option 322 equates to a simple assignment statement. As shown in FIG. 9, Mapping as a Key is a type of mapping pattern completely automated within the tool of the preferred embodiment. The tool queries for further details by providing a list of the recognised patterns 326, so that the appropriate code can be inserted into the DO and PO interfaces. The provision, in the tool, of this selection list of known patterns again leads the user to a simple assignment statement.

Figure 10:
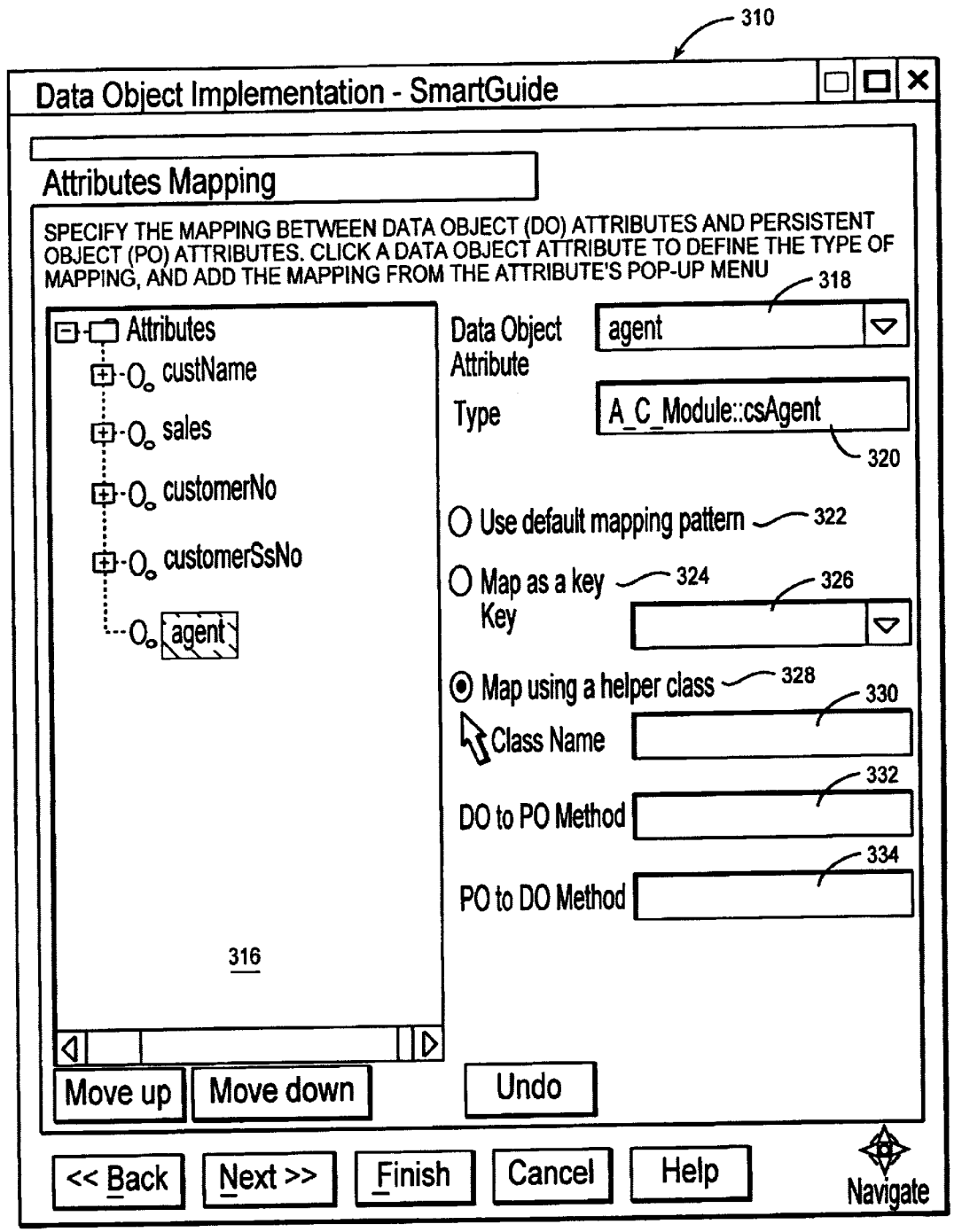
Figure 11:
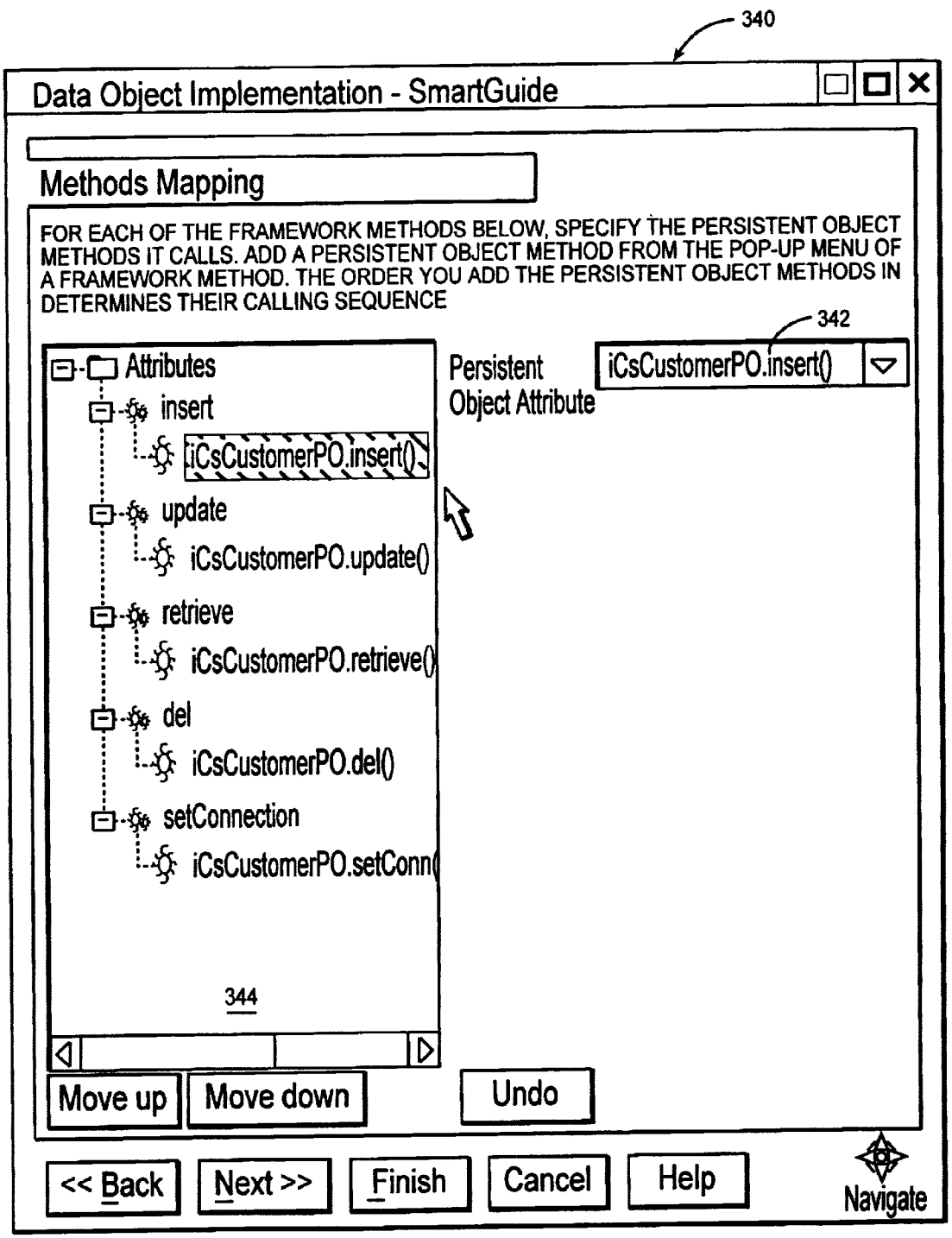
Figure 12:
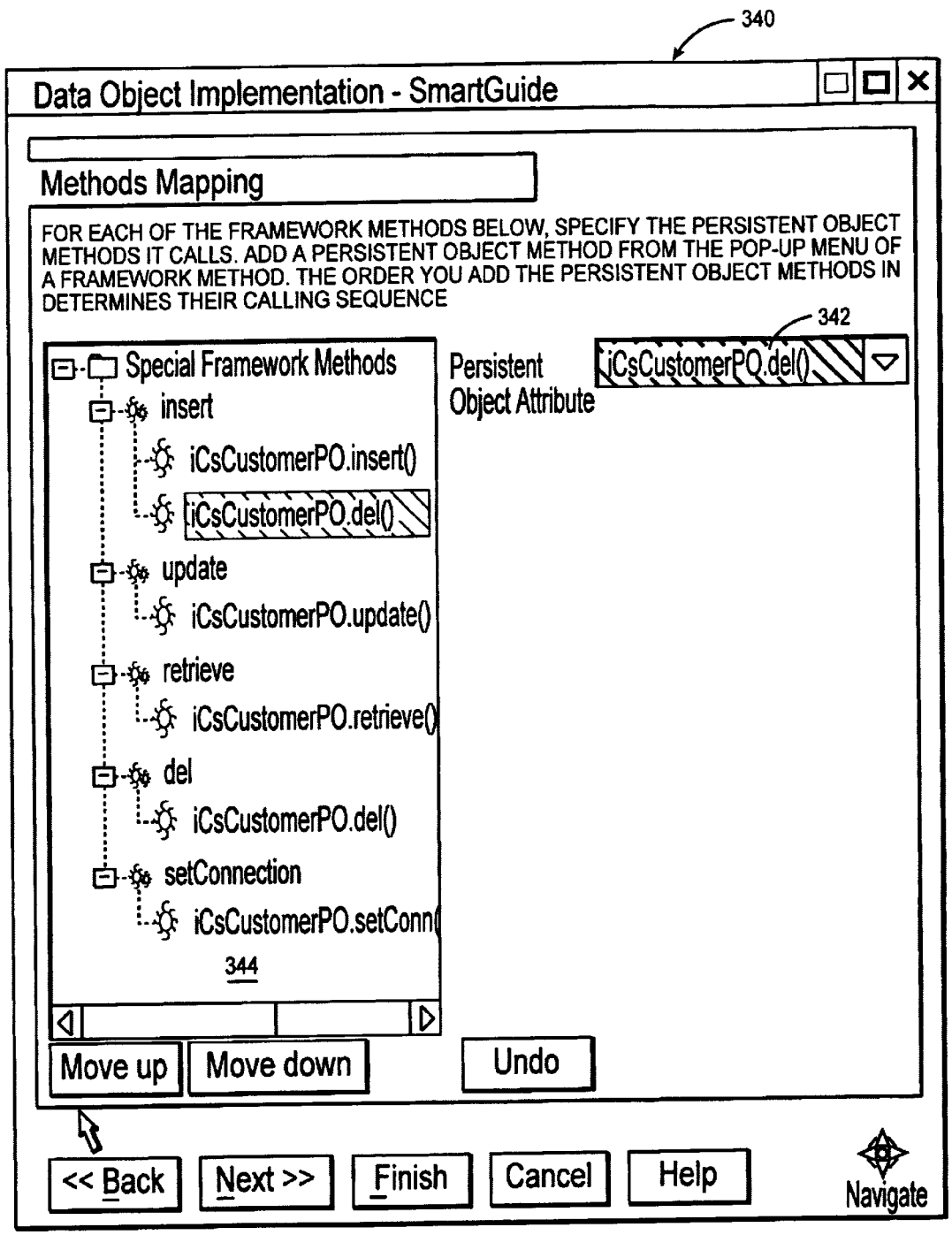

If the user does not want to map using the automatic mapping values provided by the tool, then the user selects Map using a Helper Class (button 328 in FIG. 10). The user must provide a class to do the mapping in field 330 and identify which method to use for each directional movement of the values from the DO to the PO in field 332, and from the PO to the DO in field 334. The tool will not generate inline code in the DO to do the mapping; instead, a method invocation on the specified helper class will be used for the mapping. If the user changes the mapping required between the DO and the PO attribute using a helper class, the only required change is in the mapping helper called in the DO methods.

Once all of the attribute sets for each attribute in the data object are mapped (blocks 218, 220 in FIG. 4), the methods must be mapped (block 222). For the tool of the preferred embodiment, this is illustrated in the screen captures of FIGS. 11 and 12.

In this tool, the methods of the DO, called "framework methods" 344, can be mapped to one or more PO method. This, in FIG. 11, the DO method insert listed in the tree in field 344 can be mapped to a single PO insert method (entry in field 342 is added to the tree in field 344). If more than one PO method is needed, then the user can simply select them. Thus, in FIG. 12, a PO delete method selected in field 342 has been added to the mapping of the DO's insert function in the tree displayed in field 344. As with the attributes, if the sequence of the accessing the methods is important, the user can specify the sequence by the order in which the PO methods are listed in the mapping tree 344, adjusting that sequence by selecting the move up/down button for the field.

By providing the two sets of UI specifications to separately define attribute and method mapping, the tool can gather enough information from the user to generate all the DO and PO code involved in DO to PO mapping according to the invention.

When all of the mapping is complete in the tool of the preferred embodiment, the code can be emitted. As a result of following the invention, the DO getter method could look as simple as:

```
string custName( )
{
    return iCsCustomerPO.custName( );
}
```

In the case of the implementation environment of the preferred environment, CBSeries, the code would be generated as:

```
string custName( )
{
    ::CORBA::String_var iCustNameTemp;
    iCustNameTemp = iCsCustomerPO.custName( );
    return CORBA::string_dup(iCustNameTemp);
}
```

The additional code required to handle conversions to CORBA and other program model issues are inlined in the DO. Thus, these DO unique issues are handled without touching the PO.

As discussed above, updating changes in the data base is accomplished by invoking an update method in the PO. A simple statement in the DO, such as:

```
void update( )
{
    iClaim PO.update( );
}
``` invokes the method defined in the following code segment, an update method in the DO that has been mapped to a single PO, as illustrated in FIG. 13.

```
void update( )
{
    // This method body is generated based on the properties set
    for this PO
    // To modify the content, please change the properties of this PO
    EXEC SQL INCLUDE SQLCA;
    EXEC SQL WHENEVER NOT FOUND GO TO sqlerror;
    EXEC SQL WHENEVER SQLERROR GO TO sqlerror;
    sClaimNo = &iSClaimNo;
    sClaimNoIndicator = &iSClaimNoIndicator;
    sExplanation = &iSExplanation;
    sExplanationIndicator = &iSExplanationIndicator;
    sThePolicy = &iSThePolicy;
    sThePolicyIndicator = &iSThePolicyIndicator;
    EXEC SQL UPDATE eleni.claim SET
    claimNo = :*sClaimNo :*sClaimNoIndicator,
    explanation = :*sExplanation :*sExplanationIndicator,
    thePolicy = :*sThePolicy :*sThePolicyIndicator
    WHERE
    claimNo = :*sClaimNo :*SClaimNoIndicator;
    EXEC SQL WHENEVER NOT FOUND CONTINUE; // note this
    is a macro for following
EXEC SQL WHENEVER
    EXEC SQL WHENEVER SQLERROR CONTINUE; // and not
    inline code as with other
EXEC SQL statements
    return;
    sqlerror:
    if (SQLCODE == 100)
    throw IBOIMException::IDataKeyNotFound( );
    else
    {
        sqlaintp(sqlMessage, 500, 70, &sqlca);
        throw IBOIMException::IDataObjectFailed("Object Builder.BR2",
        0, SQLCODE,   "claimPO.update", sqlMessage);
    }
}
```

The above code for the update method in the PO is all that is generated and can be reused by any user of the PO.

A more complex mapping of one DO attribute to different PO attributes simply adds one line to the DO update method. If the same PO is being used, no additional PO code is required.

While the present invention may be implemented in any object oriented programming environment, it is particularly useful in an interpreted environment such as Java or Smalltalk. Productive use of the invention in a compiled OO environment such as C++can be made, provided (specifically in the case of C++) that indirect references are minimised.

Modifications of the invention that would be obvious to the person skilled in the art are intended to be covered by the scope of the appended claims.

| APPENDIX |
|---|
| Using the tool of the preferred embodiment, the following complete code sample of a persistent object was generated for the "customer" described above. |

```
EXEC SQL INCLUDE SQLDA;
//-------------------------------------------------------------------------
csCustomerPOKey::csCustomerPOKey( )
{
    iSCustomerNoIndicator = NULL_PO_VALUE;
}
cSCustomerPOkey::~csCustomerPOKey( )
{ }
//-------------------------------------------------------------------------
// the get/set methods of the PO csCustomerPOKey
//-------------------------------------------------------------------------
// get customerNo
long csCustomerPOKey::customerNo( )
{
    if (iSCustomerNoIndicator == NULL_PO_VALUE)
    iSCustomerNo = 0;
    return iSCustomerNo;
}
// set customerNo
void csCustomerPOKey::customerNo(long aCustomerNo)
{
    iSCustomerNo = aCustomerNo;
    iSCustomerNoIndicator = NON_NULL_PO_VALUE;
}
//-------------------------------------------------------------------------
csCustomerPOCopy::csCustomerPOCopy( )
{
    iSCustNameIndicator = NULL_PO_VALUE;
    iSSalesIndicator = NULL_PO_VALUE;
    iSCustomerNoIndicator = NULL_PO_VALUE;
    iSCustomerSsNoIndicator = NULL_PO_VALUE;
    iSAgentIndicator = NULL_PO_VALUE;
}
csCustomerPoCopy::~csCustomerPOCopy( )
{ }
//-------------------------------------------------------------------------
// the get/set methods of the PO csCustomerPOCopy
//-------------------------------------------------------------------------
// get custName
char* csCustomerPOCopy::custName( )
{
    if (iSCustNameIndicator == NULL_PO_VALUE)
    return NULL;
    else
    return CORBA::string_dup(iSCustName);
}
// set custName
void csCustomerPOCopy::custName(char* aCustName)
{
    if (aCustName == NULL)
    iSCustNameIndicator = NULL_PO_VALUE;
    else {
        memcpy(iSCustName, aCustName, 101);
        iSCustNameIndicator = NON_NULL_PO_VALUE;
    }
}
// get sales
double csCustomerPOCopy::sales( )
{
    if (iSSalesIndicator == NULL_PO_VALUE)
    iSSales = 0;
    return iSSales;
}
// set sales
void csCustomerPOCopy::sales(double aSales)
{
    iSSales = aSales;
    iSSalesIndicator = NON_NULL_PO_VALUE;
}
// get customerNo
long csCustomerPOCopy::customerNo( )
{
    if (iSCustomerNoIndicator == NULL_PO_VALUE)
```

APPENDIX
Using the tool of the preferred embodiment, the following complete code sample of a persistent object was generated for the "customer" described above.

```cpp
    iSCustomerNo = 0;
    return iSCustomerNo;
}
// set customerNo
void csCustomerPOCopy::customerNo(long aCustomerNo)
{
    iSCustomerNo = aCustomerNo;
    iSCustomerNoIndicator = NON_NULL_PO_VALUE;
}
// get customerSsNo
char* csCustomerPOCopy::customerSsNo( )
{
    if (iSCustomerSsNoIndicator == NULL_PO_VALUE)
    return NULL;
    else
    return CORBA::string_dup(iSCustomerSsNo);
}
// set customerSsNo
void csCustomerPOCopy::customerSsNo(char* aCustomerSsNo)
{
    if (aCustomerSsNo == NULL)
    iSCustomerSsNoIndicator = NULL_PO_VALUE;
    else {
        memcpy(iSCustomerSsNo, aCustomerSsNo, 101);
        iSCustomerSsNoIndicator = NON_NULL_PO_VALUE;
    }
}
// get agent
long csCustomerPOCopy::agent( )
{
    if (iSAgentIndicator == NULL_PO_VALUE)
    iSAgent = 0;
    return iSAgent;
}
// set agent
void csCustomerPOCopy::agent(long aAgent)
{
    iSAgent = aAgent;
    iSAgentIndicator = NON_NULL_PO_VALUE;
}
csCustomerPO::csCustomerPO( )
{
    iSCustNameIndicator = NULL_PO_VALUE;
    iSSalesIndicator = NULL_PO_VALUE;
    iSCustomerNoIndicator = NULL_PO_VALUE;
    iSCustomerSsNoIndicator = NULL_PO_VALUE;
    iSAgentIndicator = NULL_PO_VALUE;
}
csCustomerPO::~csCustomerPO( )
{ }
//------------------------------------------------------------------------
// the get/set methods of the PO csCustomerPO
//------------------------------------------------------------------------
// get custName
char* csCustomerPO::custName( )
{
    // This method body is generated based on the properties set for this PO
    if (iSCustNameIndicator == NULL_PO_VALUE)
    return NULL;
    else
    return CORBA::string_dup(iSCustName);
}
// set custName
void csCustomerPO::custName(char* aCustName)
{
    // This method body is generated based on the properties set for this PO
    if (aCustName == NULL)
    iSCustNameIndicator = NULL_PO_VALUE;
    else {
        memcpy(iSCustName, aCustName, 101);
        iSCustNameIndicator = NON_NULL_PO_VALUE;
    }}
// get sales
```

-continued

APPENDIX
Using the tool of the preferred embodiment,
the following complete code sample of a
persistent object was generated for the
"customer" described above.

```
double csCustomerPO::sales( )
{
  // This method body is generated based on the properties set for this PO
  if (iSSalesIndicator == NULL_PO_VALUE)
  iSSales = 0;
return iSSales;}
// set sales
void csCustomerPO::sales(double aSales)
{
  // This method body is generated based on the properties set for this PO
  iSSales = aSales;
iSSalesIndicator = NON_NULL_PO_VALUE;}
// get customerNo
long csCustomerPO::customerNo( )
{
  // This method body is generated based on the properties set for this PO
  if (iSCustomerNoIndicator == NULL_PO_VALUE)
  iSCustomerNo = 0;
return iSCustomerNo;}
// set customerNo
void csCustomerPO::customerNo(long aCustomerNo)
{
  // This method body is generated based on the properties set for this PO
  iSCustomerNo = aCustomerNo;
iSCustomerNoIndicator = NON_NULL_PO_VALUE;}
// get customerSsNo
char csCustomerPO::customerSsNo( )
{
  // This method body is generated based on the properties set for this PO
  if (iSCustomerSsNoIndicator == NULL_PO_VALUE)
  return NULL;
  else
return CORBA::string_dup(iSCustomerSsNo);}
// set customerSsNo
void csCustomerPO::customerSsNo(char* aCustomerSsNo)
{
  // This method body is generated based on the properties set for this PO
  if (aCustomerSsNo == NULL)
  iSCustomerSsNoIndicator = NULL_PO_VALUE;
  else {
  memcpy(iSCustomerSsNo, aCustomerSsNo, 101);
  iSCustomerSsNoIndicator = NON_NULL_PO_VALUE;
}}
// get agent
long csCustomerPO::agent( )
{
  // This method body is generated based on the properties set for this PO
  if (iSAgentIndicator == NULL_PO_VALUE)
  iSAgent = 0;
return iSAgent;}
// set agent
void csCustomerPO::agent(long aAgent)
{
  // This method body is generated based on the properties set for this PO
  iSAgent = aAgent;
iSAgentIndicator = NON_NULL_PO_VALUE;}
//------------------------------------------------------------------------
// the framework level methods of the PO csCustomerPO
//------------------------------------------------------------------------
//
// insert method
//
void csCustomerPO::insert( )
{
  // This method body is generated based on the properties set for this PO
  // To modify the content, please change the properties of this PO
  EXEC SQL BEGIN DECLARE SECTION;
  char (*sCustName)[101];
  short* sCustNameIndicator;
  double* sSales;
  short* sSalesIndicator;
  long* sCustomerNo;
  short* sCustomerNoIndicator;
```

-continued

APPENDIX
Using the tool of the preferred embodiment,
the following complete code sample of a
persistent object was generated for the
"customer" described above.

```
   char (*sCustomerSsNo)[101];
   short* sCustomerSsNoIndicator;
   long* sAgent;
   short* sAgentIndicator;
   EXEC SQL END DECLARE SECTION;
   EXEC SQL INCLUDE SQLCA;
   EXEC SQL WHENEVER NOT FOUND GO TO sqlerror;
   EXEC SQL WHENEVER SQLERROR GO TO sqlerror;
   sCustName = &iSCustName;
   sCustNameIndicator = &iSCustNameIndicator;
   sSates = &iSSales;
   sSalesIndicator = &iSSalesIndicator;
   sCustomerNo = &iSCustomerNo;
   sCustomerNoIndicator = &iSCustomerNoIndicator;
   sCustomerSsNo = &iSCustomerSsNo;
   sCustomerSsNoIndicator = &iSCustomerSsNoIndicator;
   sAgent = &iSAgent;
   sAgentIndicator = &iSAgentIndicator;
   EXEC SQL INSERT INTO csCustomer
   (custName, sales, customerNo, customerSsNo, agent)
   VALUES
       ( :*sCustName :*sCustNameIndicator, :*sSales :*sSalesIndicator, :*sCustomerNo
:*sCustomerNoIndicator, :*sCustomerSsNo :*sCustomerSsNoIndicator, :*sAgent :*sAgentIndicator);
   EXEC SQL WHENEVER NOT FOUND CONTINUE; // note this is a macro for following EXEC SQL
WHENEVER
   EXEC SQL WHENEVER SQLERROR CONTINUE; // and not inline code as with other EXEC SQL
statements
   return;
   sqlerror:
   if (SQLCODE == 803)
   throw IBOIMException::IDataKeyAlreadyExists( );
   else
   {
      char sqlMessage[500];
      sqlaintp(sqlMessage, 500, 70, &sqlca);
      throw IBOIMException::IDataObjectFailed("Object Builder", 0, SQLCODE, "csCustomerPO.insert",
sqlMessage);
   }
}
//
// retrieve method
//
void csCustomerPO::retrieve( )
{
   // This method body is generated based on the properties set for this PO
   // To modify the content, please change the properties of this PO
   char (*sCustName)[101];
   short* sCustNameIndicator;
   double* sSales;
   short* sSalesIndicator;
   long* sCustomerNo;
   short* sCustomerNoIndicator;
   char (*sCustomerSsNo)[101];
   short* sCustomerSsNoIndicator;
   long* sAgent;
   short* sAgentIndicator;
   EXEC SQL INCLUDE SQLCA;
   EXEC SQL WHENEVER NOT FOUND GO TO sqlerror;
   EXEC SQL WHENEVER SQLERROR GO TO sqlerror;
   sCustName = &iSCustName;
   sCustNameIndicator = &iSCustNameIndicator;
   sSales = &iSSales;
   sSalesIndicator = &iSSalesIndicator;
   sCustomerNo = &iSCustomerNo;
   sCustomerNoIndicator = &iSCustomerNoIndicator;
   sCustomerSsNo = &iSCustomerSsNo;
   sCustomerSsNoIndicator = &iSCustomerSsNoIndicator;
   sAgent = &iSAgent;
   sAgentIndicator = &iSAgentIndicator;
   EXEC SQL SELECT
   custName, sales, customerNo, customerSsNo, agent
   INTO
      :*sCustName :*sCustNameIndicator, :*sSales :*sSalesIndicator, :*sCustomerNo
```

-continued

APPENDIX
Using the tool of the preferred embodiment,
the following complete code sample of a
persistent object was generated for the
"customer" described above.

```
    :*sCustomerNoIndicator, :*sCustomerSsNo :*sCustomerSsNoIndicator, :*sAgent :*sAgentIndicator
    FROM csCustomer
    WHERE
    customerNo = :*sCustomerNo :*sCustomerNoIndicator;
    memcpy(iSCustName, *sCustName, 101);
    iSCustName[100] = NULL;
    iSCustNameIndicator = *sCustNameIndicator;
    iSSales = *sSales;
    iSSalesIndicator = *sSalesIndicator;
    iSCustomerNo = *sCustomerNo;
    iSCustomerNoIndicator = *sCustomerNoIndicator;
    memcpy(iSCustomerSsNo, *sCustomerSsNo, 101),
    iSCustomerSsNo[100] = NULL;
    iSCustomerSsNoIndicator = *sCustomerSsNoIndicator;
    iSAgent = *sAgent;
    iSAgentIndicator = *sAgentIndicator;
    EXEC SQL WHENEVER NOT FOUND CONTINUE; // note this is a macro for following EXEC SQL
WHENEVER
    EXEC SQL WHENEVER SQLERROR CONTINUE; // and not inline code as with other EXEC SQL
statements
    return;
    sqlerror:
    if (SQLCODE == 100)
    throw IBOIMException::IDataKeyNotFound( );
    else
{
    char sqlMessage[500];
    sqlaintp(sqlMessage, 500, 70, &sqlca);
        throw IBOIMException::IDataObjectFailed("Object Buiider", 0, SQLCODE,
    "csCustomerPO.retrieve", sqlMessage);
    }
}
//
// update method
//
void csCustomerPO::update( )
{
    // This method body is generated based on the properties set for this PO
    // To modify the content, please change the properties of this PO
    char (*sCustName)[101];
    short* sCustNameIndicator;
    double* sSales;
    short* sSalesIndicator;
    long* sCustomerNo;
    short* sCustomerNoIndicator;
    char (*sCustomerSsNo)[101];
    short* sCustomerSsNoIndicator;
    long* sAgent;
    short* sAgentIndicator;
    EXEC SQL INCLUDE SQLCA;
    EXEC SQL WHENEVER NOT FOUND GO TO sqlerror;
    EXEC SQL WHENEVER SQLERROR GO TO sqlerror;
    sCustName = &iSCustName;
    sCustNameIndicator = &iSCustNameIndicator;
    sSales = &iSSales;
    sSalesIndicator = &iSSalesIndicator;
    sCustomerNo = &iSCustomerNo;
    sCustomerNoIndicator = &iSCustomerNoIndicator;
    sCustomerSsNo = &iSCustomerSsNo;
    sCustomerSsNoIndicator = &iSCustomerSsNoIndicator;
    sAgent = &iSAgent;
    sAgentIndicator = &iSAgentIndicator;
    EXEC SQL UPDATE csCustomer SET
    custName = :*sCustName :*sCustNameIndicator,
    sales = :*sSales :*sSalesIndicator,
    customerNo = :*sCustomerNo :*sCustomerNoIndicator,
    customerSsNo = :*sCustomerSsNo :*sCustomerSsNoIndicator,
    agent = :*sAgent :*sAgentIndicator
    WHERE
    customerNo = :*sCustomerNo :*sCustomerNoIndicator;
    EXEC SQL WHENEVER NOT FOUND CONTINUE; // note this is a macro for following EXEC SQL
WHENEVER
    EXEC SQL WHENEVER SQLERROR CONTINUE; // and not inline code as with other EXEC SQL
```

APPENDIX
Using the tool of the preferred embodiment,
the following complete code sample of a
persistent object was generated for the
"customer" described above.

```
statements
  return;
  sqlerror:
  if (SQLCODE == 100)
  throw IBOIMException::IDataKeyNotFound( );
  else
  {
    char sqlMessage[500];
    sqlaintp(sqlMessage, 500, 70, &sqlca);
      throw IBOIMException::IDataObjectFailed("Object Builder", 0, SQLCODE,
"csCustomerPO.update", sqlMessage);
  }
}
//
// delete method
//
void csCustomerPO::del( )
{
    // This method body is generated based on the properties set for this PO
    // To modify the content, please change the properties of this PO
    char (*sCustName)[101];
    short* sCustNameIndicator;
    double* sSales;
    short* sSalesIndicator;
    long* sCustomerNo;
    short* sCustomerNoIndicator;
    char (*sCustomerSsNo)[101];
    short* sCustomerSsNoIndicator;
    long* sAgent;
    short* sAgentIndicator;
    EXEC SQL INCLUDE SQLCA;
    EXEC SQL WHENEVER NOT FOUND GO TO sqlerror;
    EXEC SQL WHENEVER SQLERROR GO TO sqlerror;
    sCustomerNo = &iSCustomerNo;
    sCustomerNoIndicator = &iSCustomerNoIndicator;
    EXEC SQL DELETE FROM csCustomer
    WHERE
    customerNo = :*sCustomerNo :*sCustomerNoIndicator;
    EXEC SQL WHENEVER NOT FOUND CONTINUE; // note this is a macro for following EXEC SQL
WHENEVER
    EXEC SQL WHENEVER SQLERROR CONTINUE; // and not inline code as with other EXEC SQL
statements
  return;
  sqlerror:
  if (SQLCODE == 100)
  throw IBOIMException::IDataKeyNotFound( );
  else
  {
    char sqlMessage[500];
    sqlaintp(sqlMessage, 500, 70, &sqlca);
    throw IBOIMException::IDataObjectFailed("Object Builder", 0, SQLCODE, "csCustomerPO.del",
sqlMessage);
  }
}
//
// setConnection method
//
void csCustomerPO::setConnection(const char * dataBaseName)
}
    // This method body is generated based on the properties set for this PO
    // To modify the content, please change the properties of this PO
    EXEC SQL BEGIN DECLARE SECTION;
    static char csCustomerDB[32];
    EXEC SQL END DECLARE SECTION;
    strcpy(csCustomerDB, dataBaseName);
    EXEC SQL INCLUDE SQLCA;
    EXEC SQL WHENEVER NOT FOUND GO TO sqlerror;
    EXEC SQL WHENEVER SQLERROR GO TO sqlerror;
    EXEC SQL SET CONNECTION :csCustomerDB;
    EXEC SQL WHENEVER NOT FOUND CONTINUE; // note this is a macro for following EXEC SQL
WHENEVER
    EXEC SQL WHENEVER SQLERROR CONTINUE; // and not inline code as with other EXEC SQL
statements
```

APPENDIX
Using the tool of the preferred embodiment, the following complete code sample of a persistent object was generated for the "customer" described above.

```
    return;
  sqlerror:
  char sqlMessage[500];
  sqlaintp(sqlMessage, 500, 70, &sqlca);
      throw IBOIMException::IDataObjectFailed("Object Builder", 0, SQLCODE,
"csCustomerPO.setConnection", sqlMessage);
}
//
// internalizeFromPrimarKey method
//
void csCustomerPO::internalizeFromPrimarykey(csCustomerPOKey & aCsCustomerPOkey)
{
  // This method body is generated based on the properties set for this PO
  // To modify the content, please change the properties of this PO
  customerNo(aCsCustomerPOkey.customerNo( ));
}
// internalizeFromCopyHelper method
//
void csCustomerPO::internalizeFromCopyHelper(csCustomerPOCopy & aCsCustomerPOCopy)
{
  // This method body is generated based on the properties set for this PO
  // To modify the content, please change the properties of this PO
  custName(aCsCustomerPOCopy.custName( ));
  sales(aCsCustomerPOCopy.sales( ));
  customerNo(aCsCustomerPOCopy.customerNo( ));
  customerSsNo(aCsCustomerPOCopy.customerSsNo( ));
  agent(aCsCustomerPOCopy.agent( ));
}
//
// internalizeKeyAttributes method
//
void csCustomerPO::internalizeKeyAttributes(csCustomerPOKey & aCsCustomerPOKey)
{
  // This method body is generated based on the properties set for this PO
  // To modify the content, please change the properties of this PO
  customerNo(aCsCustomerPOKey.customerNo( ));
}
//
// externalizeKeyAttributes method
//
void csCustomerPO::externalizeKeyAttributes(csCustomerPOKey & aCsCustomerPOKey)
{
  // This method body is generated based on the properties set for this PO
  // To modify the content, please change the properties of this PO
  aCsCustomerPOkey.customerNo(iSCustomerNo);
}
//
// internalizeData method
//
void csCustomerPO::internalizeData(csCustomerPOCopy & aCsCustomerPOCopy)
{
  // This method body is generated based on the properties set for this PO
  // To modify the content, please change the properties of this PO
  custName(aCsCustomerPOCopy.custName( ));
  sales(aCsCustomerPOCopy.sales( ));
  customerNo(aCsCustomerPOCopy.customerNo( ));
  customerSsNo(aCsCustomerPOCopy.customerSsNo( ));
  agent(aCsCustomerPOCopy.agent( ));
}
```

The embodiments of the invention in which an exclusive property or privilege is claimed are defined as follows:

1. In an object oriented programming environment, a system for reducing the size of a program data object and for giving the program data object access to stored data located in multiple locations, comprising:

at least one persistent object wrapper having the attributes and methods of the program data object and isolating access code containing access code for a unique view of data accessed from multiple storage locations for the stored data into reusable modules; and means for invoking said access code from the program data object using method invocation on the program data object.

2. A system, according to claim 1, wherein said at least one persistent object wrapper comprises a plurality of access code modules, each module containing access code for a unique view of data accessed from multiple storage locations within a relational data base.

3. A system, according to claim 1, wherein the means for invoking said access code comprises means for direct invocation of the persistent object wrapper to perform its access method.

4. A system, according to claim 3, wherein the means for invoking said access code comprises means for direct invocation of the persistent object wrapper to perform a get or set method on the stored data accessible by the access code.

5. An object builder tool implemented in software for reducing the size of program data objects and for mapping the program data objects with stored data, comprising:

means for wrapping blocks of access code to the stored data for a unique view of data accessed from multiple storage locations in a relational data base in reusable code modules in at least one persistent object having attributes and methods of the program data objects; and means for inlining access code to the reusable code modules in the program data objects.

6. An object builder tool, according to claim 5, wherein the means for wrapping blocks of access code to the stored data in reusable code modules, comprises:

means for isolating attributes from methods in a given program data object;

means for defining a set of attributes for the given program data object in at least one wrapper object, including means for sequentially mapping each attribute in the given data object to at least one attribute in said at least one wrapper object;

means for defining a set of methods for the given program data object in at least one wrapper object, including means for sequentially mapping each method in the given data object to at least one method in said at least one wrapper object;

means for generating the reusable code modules in said at least one wrapper object according to the defined attributes and methods.

7. A method for creating wrappers for reusable code blocks for access to stored data, comprising, for each selected data object:

defining at least one persistent object instance;

defining the attribute mapping from the data object to said at least one persistent object instance;

defining the method mapping from the data object to said at least one persistent object instance;

generating code to define said at least one persistent object according to the defined associations of data object attributes and methods; and generating inline code in the data object to invoke methods in said at least one persistent if object to access the stored data for a unique view of data accessed from multiple storage locations within a relational data base.

8. A method, according to claims 7, wherein the step of defining the attribute mapping comprises defining an association between each attribute in the selected data object and at least one persistent object attribute, and wherein the step of defining the method mapping comprises defining an association between each method in the selected object and at least one persistent object method.

9. A method, according to claim 8 wherein the step of defining an association between each attribute in the selected data object and at least one persistent object attribute comprises defining a mapping sequence for the data object attributes to said at least one persistent object attribute, and wherein the step of defining an association between each method in the selected object and at least one method persistent object method comprises defining a mapping sequence for the data object methods to said at least one persistent object method.

10. A method, according to claim 8 wherein the step of defining an association between each attribute in the selected data object and at least one persistent object attribute comprises defining mapping types of said at least one persistent object attribute, and wherein the step of defining an association between each method in the selected object and at least one method persistent object method comprises defining mapping types of said at least one persistent object method.

11. A program storage device readable by a machine, tangibly embodying a program of instructions executable by the machine to perform method steps for creating wrappers for reusable code blocks for access to stored data, for each selected data object said method steps comprising:

defining at least one persistent object instance;

defining the attribute mapping from the data object to said at least one persistent object instance;

defining the method mapping from the data object to said at least one persistent object instance;

generating code to define said at least one persistent object according to the defined associations of data object attributes and methods; and generating inline code in the data object to invoke methods in said at least one persistent object to access the stored data for a unique view of data accessed from multiple storage locations within a relational data base.

* * * * *